United States Patent [19]

De Coene et al.

[11] 3,847,160
[45] Nov. 12, 1974

[54] CLEANING DEVICE SHIELDING MEANS IN COMBINE HARVESTERS

[75] Inventors: Frans J. G. C. De Coene, Zedelgem; Cornelis G. M. Muijs, Sint-Kruis/Brugge, both of Belgium

[73] Assignee: Clayson N.V., Zedelgem, Belgium

[22] Filed: Oct. 20, 1972

[21] Appl. No.: 299,553

[30] Foreign Application Priority Data
Oct. 25, 1971 Great Britain.................... 49445/71
Feb. 24, 1972 Great Britain...................... 8578/72
Oct. 11, 1972 Great Britain.................... 46854/72
Oct. 11, 1972 Great Britain.................... 46855/72

[52] U.S. Cl. ............................. 130/27 T, 130/27 F
[51] Int. Cl. ......................................... A01f 12/20
[58] Field of Search... 130/27 T, 27 E, 27 F, 27 HF, 130/27 Q, 27 Z, 26

[56] References Cited
UNITED STATES PATENTS
3,529,645  9/1970  Murray et al. .................... 130/27 T
3,556,108  1/1971  Knapp et al. ..................... 130/27 T
3,645,270  2/1972  Rowland-Hill et al. ........... 130/27 T
3,669,125  6/1972  Rowland-Hill .................... 130/27 T Primary Examiner—Antonio F. Guida
Attorney, Agent, or Firm—Louis J. Virelli, Jr.; Frank A. Seemar; John R. Flanagan

[57] ABSTRACT

The invention comprises cleaning device shielding means for combine harvesters of the type comprising threshing means, separating means located rearwardly of the threshing means, a cleaning device extending in general fore-and-aft direction of the combine beneath the threshing means and the separating means, wherein a protective screen is separating the threshing and separating means from the cleaning device so as to prevent or attenuate the interference of unchecked airflow generated by the spinning threshing and separating means with the operation of the cleaning device.

3 Claims, 11 Drawing Figures

CLEANING DEVICE SHIELDING MEANS IN COMBINE HARVESTERS

BACKGROUND OF THE INVENTION

1. Field of the Invention

The invention relates to combine harvesters (combines) and has for its main object the provision of a protective means to prevent or to attenuate the interference of unchecked airflow generated by the spinning threshing and separating means with the operation of the cleaning device. The invention more particularly relates to axial flow types combines wherein at least the separating means, but eventually also the threshing means are of the axial flow type.

By axial flow type combine is meant combine harvesters having rotary threshing and separating means having its axis of rotation extending generally fore-and-aft of the combine so that, in use, crop material flows in a spiral path axially of the means in passing from the input end to the discharge end.

Reference to front and rear throughout this specification is with respect to the normal direction of movement of the combine when operative.

Description of the Prior Art

In conventional axial flow type combines the axial flow type rotor means extend in general fore-and-aft direction on top of and at the forward end of the cleaning device. The cleaning device normally comprises a forward grain pan extending underneath the rotor means in general fore-and-aft direction and is operable to collect the threshed and separated grain from the threshing and separating means and to transfer this threshed and separated grain to the cleaning sieves, which extend rearwardly of and slightly below the discharge end of the grain pan. The cleaning device further comprises a cleaning fan extending underneath the grain pan and operable to direct cleaning air upwardly rearwardly through the sieves and the grain to be cleaned and located on the sieves.

In conventional axial flow type combines of the types described above, unchecked airflows generated by the spinning rotor means interfere with the operation of the cleaning device, whereby proper cleaning of the grain becomes often impossible or at least very difficult to accomplish and much grain is often lost over the rear end of the cleaning device.

In other conventional axial flow type combines a rearward separating and discharge beater, having its axis of rotation extending transversally, may be disposed on top of an additional separator grate and in a crop transfer relationship with the discharge end of the axial flow type separating rotor means for, in use, to constitute a crop transporting means, to accomplish an additional grain separation and to discharge the threshed straw out of the combine onto the ground.

The beater as described above also generates airflows which as well as the airflows generated by the spinning rotor means interfere with the operation of the cleaning device.

SUMMARY OF THE INVENTION

According to the present invention in a combine comprising threshing means, separating means located rearwardly of the threshing means, a cleaning device extending in general fore-and-aft direction of the combine beneath the threshing means and the separating means, a protective screen separating the threshing and separating means from the cleaning device is provided to prevent or attenuate the interference of unchecked airflow generated by the spinning threshing and separating means with the operation of the cleaning device.

The invention is especially advantageous in combination with an axial flow type combine harvester comprising at least separating means, but eventually also threshing means of the axial flow type. The protective screen may also separate the rearward transversally extending discharge beater of an axial flow combine from the cleaning device. A protective screen may also extend rearwardly of the rearward transversally extending discharge beater.

The protective screen is preferably also operative as a collector grain pan to collect the threshed and separated grain and convey and control its movement forwardly of the combine to the cleaning device. A transfer grain pan may be interposed between the collector grain pan and the cleaning sieves to transfer the collected grain from the collector grain pan to the cleaning sieves.

The protective screen according to the invention prevents the draughts created by the threshing and separating means to work against the cleaning air and to blow grains over the rearward edge of the cleaning sieves.

BRIEF DESCRIPTION OF THE DRAWINGS

Two embodiments of the present invention will now be described in greater detail, by way of example, with reference to the accompanying drawings, in which.

DESCRIPTION OF ONE PREFERRED EMBODIMENT

General

Figure 1:
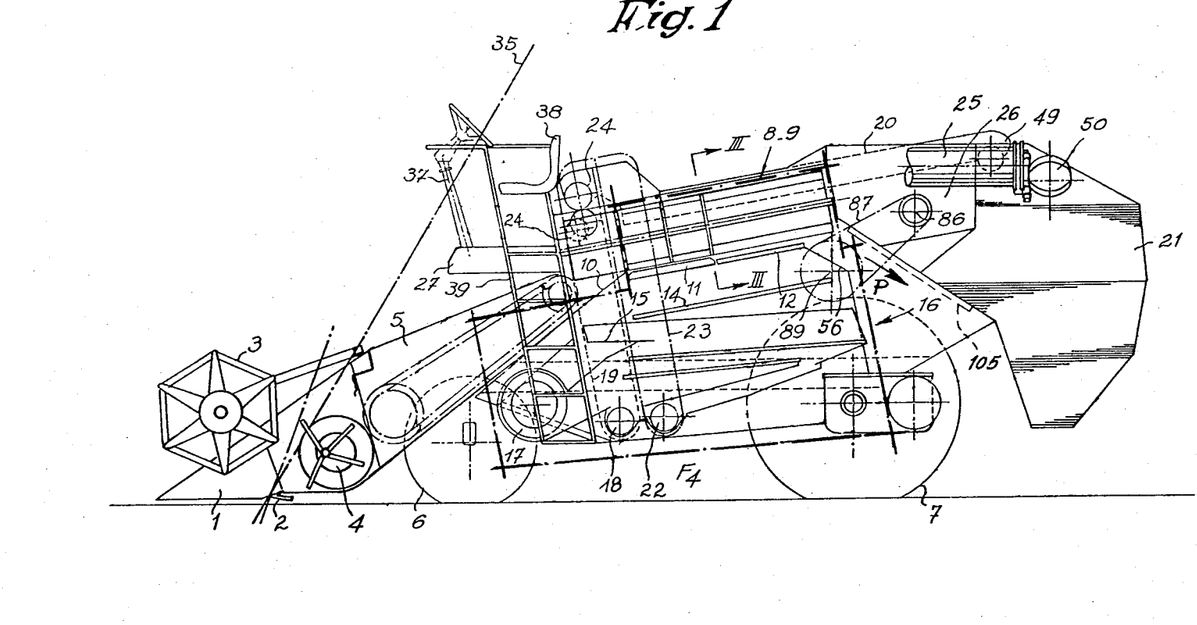
FIG. 1 is a schematic side elevational view illustrating the arrangement of the different parts of a combine according to the invention.

As shown in FIG. 1 the combine according to the invention comprises the usual header 1 with a cutting or mowing device 2, a reel 3 and an auger 4, and a crop elevator 5 provided behind the header 1. A pair of front wheels 6 are steered and a pair of larger rear wheels 7 are driven.

Figure 3:
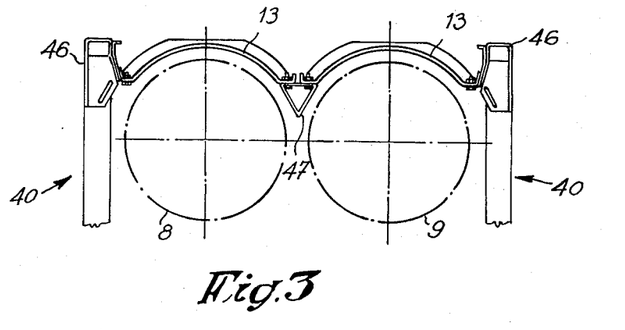
FIG. 3 is a schematical sectional view on the line III—III of FIG. 1.

A pair of combined threshing and separating units of the axial flow type are provided in side-by-side relationship extending substantially fore-and-aft of the combine. In each unit the separating section is located rearwardly of the threshing section and the respective rotors are indicated by the generating lines 8 and 9 (FIG. 3). The rotors 8, 9 are mounted in respective cylindrical housings which at their lower forward ends join a feed or guide ramp 10, which in turn joins the crop elevator 5, the ramp thus feeding the crop directly to the rotors 8 and 9 from the elevator. Towards the middle of each threshing and separating unit the normal threshing concave 11 is provided a separating concave 12 being located at the rear thereof. Above each rotor 8–9 a removable cover 13 is provided, these covers forming the top or highest point of that part of the combine.

Figure 4:
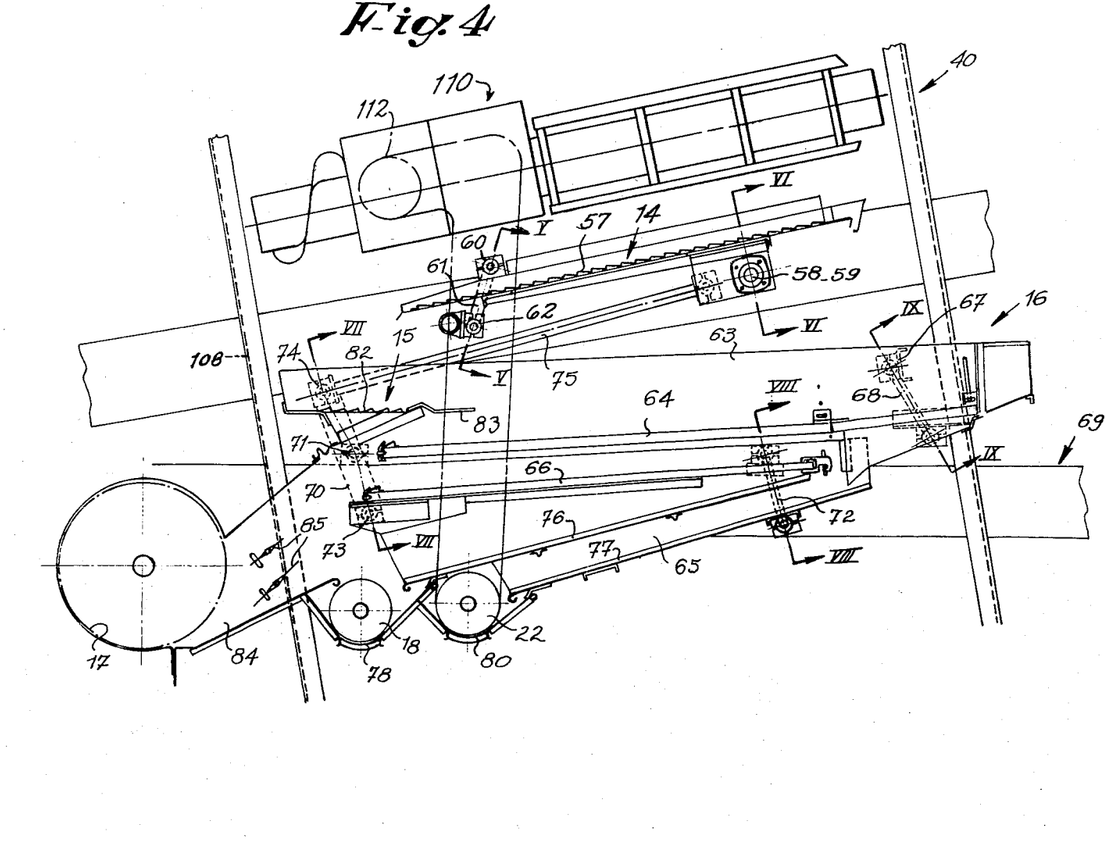
FIG. 4 is an enlarged schematical view of the part indicated as F4 in FIG. 1.
Figure 5:
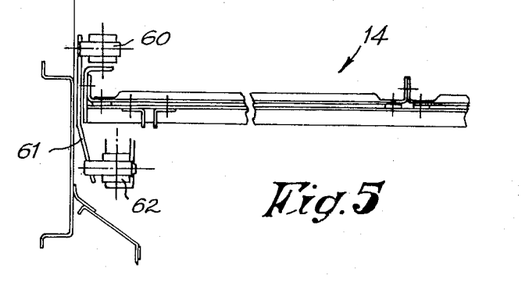
FIGS. 5, 6, 7, 8 and 9 are sectional views on the lines V—V, VI—VI, VII—VII, VIII—VIII and IX—IX, respectively, of FIG. 4.

Beneath the threshing and separating units an inclined collector grain pan 14 is provided, by which grain falling from said units is conveyed forwardly of the combine to a transfer pan 15, and thence to a cleaning device 16. As shown in FIGS. 1 and 4, the cleaning device 16 is mounted in an extreme forward position on the combine as compared with the position in a conventional combine. A fan 17 of the device is located between the front steerable wheels 6. The cleaning device 16 is positioned directly below and terminates substantially below the discharge ends of the threshing and separating units.

The collector grain pan 14 forms a protective screen shielding the cleaning device from the draught created by the threshing means and the separating means.

After having been treated in the cleaning device 16, in a manner to be explained hereafter, the grain is fed to a clean grain auger 18 which transfers it to a grain conveyor 19, the upper end of the latter being in a grain transfer relationship with a rearwardly extending grain elevator 20, which takes the grain to a grain tank 21 located at the rear end of the combine. Tailings which are segregated in the cleaning device 16 are fed back into the threshing units by a tailings auger 22, a tailings elevator 23, and a tailings distributing auger 24.

The grain tank 21 is provided with a discharge tube 25, only partially shown in the drawings, which can either be held in a retracted position for road transport, as illustrated in FIG. 1, or can be moved into an operative position in order to transfer the grain from the tank 21 into a trailer or the like placed alongside the combine or a silo. The wheels 7 and the other driven components of the combine are driven by an engine (not shown), mounted between the rear end of the threshing and separating units and the grain tank 21. In front of the threshing and separating units and above the crop elevator 5, the operator's deck or platform 27 is provided.

As shown in FIG. 1, the operator's platform 27 with a steering column 37, an operator's seat 38 and a ladder 39 have been displaced towards the rear, whereby the line of sight 35 of the operator when the latter has taken up his position on the platform is much less inclined to the horizontal as is seen from a comparison with the line of sight 36 of the conventional machine.

FIG. 1 further schematically shows a grain distributing auger 49 in the grain tank, which is installed in a grain transfer relationship with the rearwardly extending grain elevator 20 for distributing the grain in the tank. The grain tank outlet opening is schematically indicated at 50.

The engine, which as already stated, is located between the grain tank and the discharge ends of the threshing and separating units, has a drive shaft 86 with a plurality of pulleys. The main power shaft 89 is driven via a belt 87 from the engine drive shaft. Further details of the combine drive have not been shown in the figures for matter of clarity.

Figure 2:
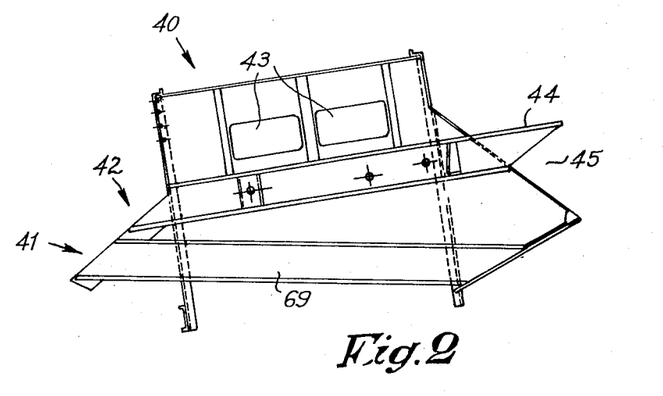
FIG. 2 is a schematic side elevational view of the main frame or chassis of the combine constructed in accordance with the invention.

A frame or chassis 40 of the combine has been shown in FIG. 2 schematically in side elevation. This frame presents a lower forwardly extending projection 41 on which the steerable wheels and the afore mentioned fan 17 are mounted. At a point above this projection 41, the crop elevator 5 is connected to the frame in such a way that, in the working position, the lower side of the crop elevator 5 lies a short distance above an upper edge 42 of the frame 40. In both side walls of the frame 40, openings 43 are provided through which access to the threshing and separating units may be gained from the sides of the machine. At its rear end the frame 40 is provided with a supporting member 44 for the driving engine, and with a recess 45 adapted to receive a projecting part of the grain tank 21.

The rotors 8 and 9 can be of any axial flow type and will not be described in more detail. The housings 110 for the rotors (partially shown in FIG. 4) are mounted on the frame, the aforementioned covers 13 being fixed each on a longitudinal side beam 46 and on a middle beam 47 of the frame. The covers 13 are each provided, adjacent the threshing and separating units, with flights or fins (not shown) operable to guide crop material generally axially, as well as circumferentially, of the units.

As is apparent from FIG. 1, the tailings return auger 24 is mounted above the front part of the covers 13 in order to feed the tailings vie two openings, one in each cover 13, back to the threshing and separating units. FIG. 4 shows an embodiment in which the tailings auger. 24 passes through an opening 112 in one side wall 40 of the machine, and extends into the housing of one of the rotors in order to feed the tailings directly to one of the rotors.

Cleaning device

The cleaning device 16 is virtually the same as that used in a conventional combine, subject to minor adaptations. This device is shown more particularly in FIGS. 4 to 9. As appears from FIG. 1, behind the separating concaves 12 there is provided an inclined guide plate 56 over which the straw moves rearwardly and out of the combine in the direction of the arrow P, the bottom wall of a casing for the engine and the front wall of the grain tank 21 part defining the straw discharge passage. As shown in FIG. 1, check flaps or baffles 105 may be provided on a portion of the front. wall of the grain tank 21 to spread the discharged straw.

Figure 6:
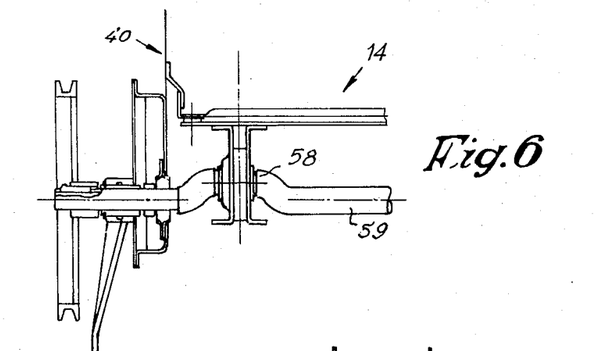
Figures 7, 8, 9:
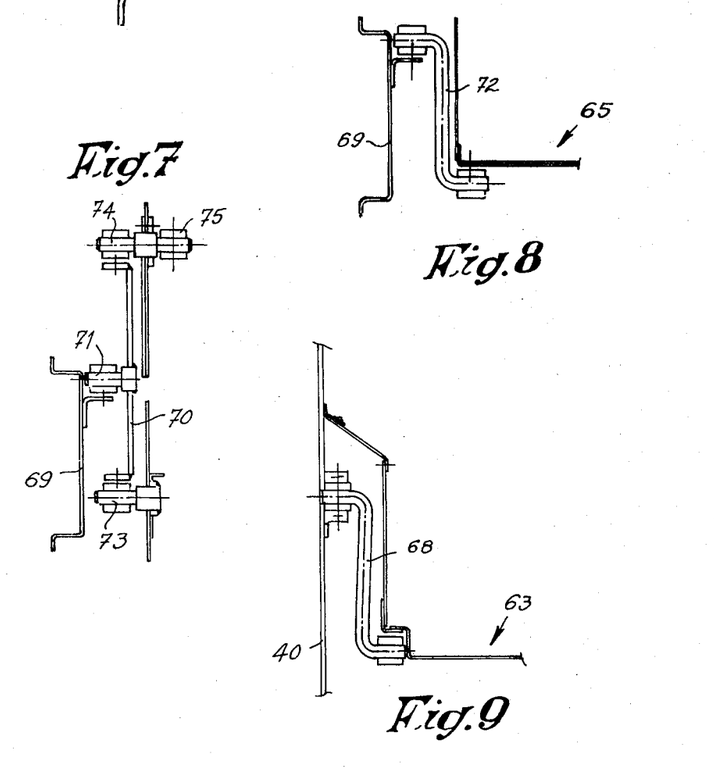

The grains separated in the threshing and separating unit are collected, together with small impurities, on he collector grain pan 14. The latter mainly comprises a corrugated surface having step-shaped ridges 57 so disposed that the forward flanks are steep, whereas the rearwardly extending flanks present relatively gentle slopes. At its rear end the collector grain pan 14 is mounted on cranks 58 (of which one only is shown in FIG. 6) of a crank shaft 59, while at its front end it is suspended by pivots or hinges 60 from links 61 which extend from a fixed supporting part 62. Thus when the shaft 59 rotates, it imparts reciprocatory motion to the collector grain pan 14, whereby the movement of the grain is controlled and caused to travel in a forward direction on the pan.

The cleaning device 16 mounted underneath the collector grain pan 14 comprises a first reciprocable shoe 63 which includes an upper sieve 64 and the transfer grain pan 15, and a second shoe 65 which includes a lower sieve 66. The shoe 63 is suspended from a supporting member 67 attached to the frame 40 of the machine by two swing arms of levers 68, and from a shaped longitudinal section 69 of the frame by two other swing arms or levers 70 each having a pivot 71 attached to the frame.

The shoe 65 is also suspended from the frame 40 on the one hand by two swing arms or levers 72, and on the other hand by the swing arms 70 to which the shoe 65 is pivoted by pivots 73, whereas the shoe 63 is pivoted to the same swing arms 70 by pivots 74. The upper ends of both swing arms 70 are pivotally connected to one end of respective rods 75 the other end of which is pivotally connected to the collector grain pan 14. In this way it is obtained that, when the shaft 59 rotates, the swing arms 70 are caused to swing around their pivots 71, so as to impart reciprocatory motion in opposite directions to the upper shoe 63 and the lower shoe 65, respectively, on account of the pivots 73 of the lower shoe being located below the fixed pivots 71 of the swing levers 70, whereas the pivots 74 of the upper shoe are located above the fixed pivots 71.

The lower shoe 65 also comprises a grain collecting pan 76 and a tailings collecting pan 77.

With the exception of the rods 75 and the transfer pan 15, the cleaning device 16 is almost entirely known, and the description has been given only for illustration and clarification. The clean grain proceeds to a grain gully or trough 78, to be displaced therein, through the action of a grain auger 18, towards one side of the machine, whence it is conveyed by the grain conveyor 19 and then the elevator 20 to the grain tank 21. The tailings in turn proceed to a tailings gully or trough 80 to be displaced therein, through the action of the tailings auger 22, towards the tailings elevator 23, the tailings finally being distributed by the tailings auger 24 between the rotors 8 and 9.

In front of, and underneath the grain pan 14, the transfer pan 15 is provided and is connected to the shoe 63 whereby its shares the movement thereof. The pan 15 has step-shaped corrugations 82, the latter being shaped and located in such a way as to cause the grain thereon, when the shoe 63 reciprocates, to be displaced towards the sieve 64. Preferably a rake 83 is provided rearwardly of the pan 15 to rake the grain as it passes to the sieve 64. As is usual, the cleaning device 16 also comprises the fan 17 with which is associated an outlet air channel 84 having guide or deflector blades 85. Protective screen In conventional axial flow combines not having a protective screen between on the one hand the threshing and separating means 8-9 and on the other hand the cleaning device 16, the spinning rotor means create draughts which are directed onto the cleaning sieves 64-66 in a downward direction, thereby opposing the cleaning air generated by the cleaning fan 17 and thus disturbing the cleaning operation of the cleaning device 16. It has been experienced that, for an optimum operation of the cleaning device 16, the upward vertical components of the cleaning air streams should be the strongest in the forward sections of the cleaning sieves 64,66. The downwardly directed draughts generated by the threshing and separating means 8-9 cause the resultant vertical components of the air streams to be weak in the forward sections of the cleaning sieves 64-66. This results in much grain being lost over the rear edge of the cleaning device 16 as well as much grain landing on the tailings return pan 77 whereby first the tailings return elements 22, 23, 24 and finally the threshing and separating means 8,9 as well as the cleaning device 16 can become overloaded.

Moreover, it has been experienced that relatively strong and rearwardly directed horizontal components of air streams are blowing not only chaff and other impurities but also grain kernals out of the cleaning device 16 also thereby causing the combine to operate at unacceptable grain loss rates.

The protective screen 14 according to the invention shields the cleaning device 16 from the draughts created by the spinning threshing and separating means 8-9, whereby the cleaning air generated by the cleaning fan 17 is no longer opposed by unchecked airflows The protective screen 14 is simultanuously used as a collector grain pan to collect threshed and separated grain and to control the transfer of this grain to the cleaning device 16.

The protective screen and collector grain pan 14 further deflects the draughts created by the spinning threshing and separating means 8-9 in a forward direction, whereby these draughts assist in controlling the movement of the material, over the collector grain pan and protective screen 14. Due to the relatively long distance to be completed by the air streams created by the spinning threshing and separating means 8,9, the rearwardly directed horizontal components thereof above the cleaning sieves are considerably attenuated, whereby these horizontal components no longer cause any unacceptable grain losses over the cleaning sieves.

The collector grain pan and protective screen 14 provides for a very satisfactory distribution of the grain in the cleaning unit as the grain travels over a relatively long grain pan towards the cleaning device.

DESCRIPTION OF ANOTHER PREFERRED EMBODIMENT

Figures 10, 11:
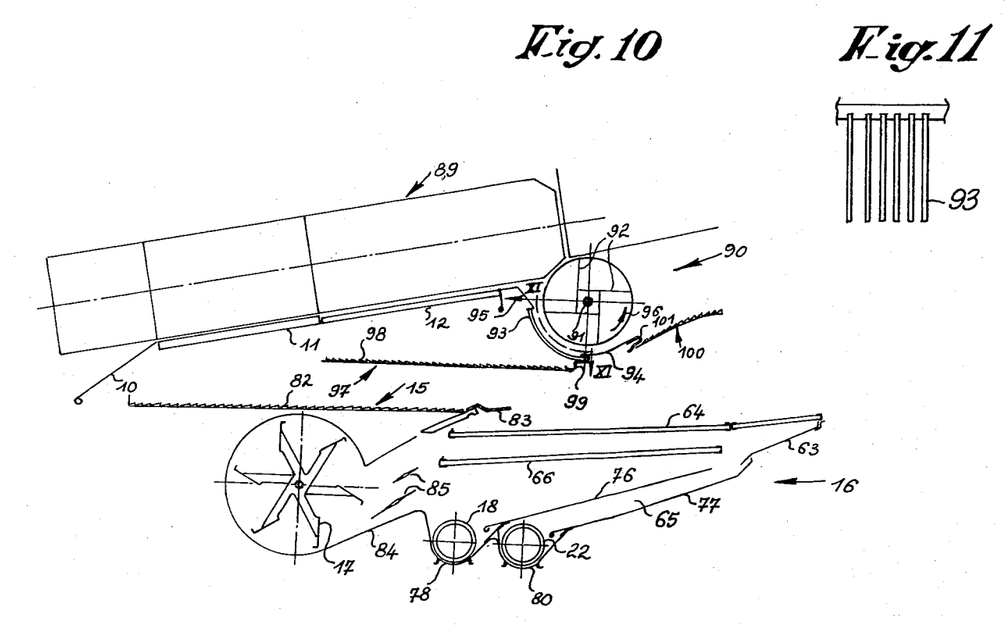
FIG. 10 is a schematic side elevational view illustrating another embodiment of the invention.
FIG. 11 is a view of the separator grate taken along line XI—XI, of FIG. 10.

FIG. 10 schematically shows by way of example another embodiment of the invention applied on an axial flow combine, having a rear discharge beater, the latter being operatively associated with a separator grate and being in crop transfer relationship with the discharge end of the axial flow type threshing and separating rotor means. In both embodiments like components have been identified with like reference numerals.

A rotary discharge beater 90 having a central shaft 91 and blades 92 extend transversally of the combine in cooperative relationship with a transversally extending separator grate 93 and a guide ramp 94 and in crop transfer relationship with the discharge ends of the axial flow type threshing and separating rotor means 8-9. The separator grate 93 comprises parallel rods extending from the transition portion 95 to the guide ramp 94 defining thereby elongated separator openings. The transistion portion 95 is secured to the rear ends of the axial flow type separator grates 12.

In operation the discharge beater 90 is rotated in the direction 96 and transfers the straw which is discharged from the axial flow separator means rearwardly over the separator grate 93 and the guide ramp 94 and finally projects it out of the combine onto the ground.

The sudden change in the direction of movement of the crop material and the provision of the separator grate 93 provides an additional grain separation through the latter. In axial flow combines not having the protective screen, the grain, which is separated by the rear discharge beater 90 and separator grate 93, is intended to fall directly onto the cleaning sieve 64 at an intermediate portion thereof, this already being disadvantageous as the cleaning surface is not used over its full length for cleaning this grain. Further, it has been experienced that the relatively strong and horizontal components of air streams above the cleaning device 16 deflect the falling grain, separated through the separator grate 93, and often cause this grain to land over the rear edge of the cleaning device 16, whereby this grain is lost.

The spinning beater 90 also generates strong unchecked air streams which are directed downwardly at the forward section of the sieves 64, 66, thereby opposing the cleaning air and resulting in the same disadvantages as described with relation to the first embodiment.

According to the present invention a protective screen and collector grain pan 97 is provided extending forwardly from a location underneath and rearwardly of the separator grate 93 towards, although it may extend to underneath the forward end of the threshing and separating means, preferably underneath the rear edge of the threshing concave 11. The protective screen and collector grain pan 97 is preferably suspended from guide ramp 94 and has step-shaped ridges 98 so disposed that the forward flanks are steep whereas the rearwardly extending flanks present relatively gentle slopes. The opening between the movable screen 97 and the rear end of the separator grate 93 or guide ramp 94 is sealed with a flexible seal 99.

The protective screen according to the invention prevents the draughts created by the axial flow type threshing and separating means 8–9 and the rotary discharge beater 90 to work against the cleaning air and to cause grains to become lost over the rearward edge of the cleaning device 16.

The grain separated through the grates 93 and 12 is conveyed forwardly and discharged onto the transfer grain pan 15, whereby all the grain is traveling over a relatively long distance before being transfered onto the forward section of the cleaning sieves 64, 66 whereby these sieves are used over their full length and whereby no grain kernels have to cross strong horizontally directed air streams whereby they could be blown out of the combine.

The protective screen 97 also deflects the draughts generated by the rotor means 8–9 and the discharge means 90 in a forward direction whereby these draughts assist in transporting the material over the collector grain pan and protective screen 97 in a forward direction.

The horizontal components of the air streams above the cleaning sieves are considerably attenuated as result of the shielding of the latter, whereby these horizontal components of the air streams do no longer cause any unacceptable grain losses over the cleaning sieves.

Also a very satisfactory distribution of the grain in the cleaning unit is obtained for the same reason as described with respect to the first embodiment.

Variants

In a further embodiment the separation of the threshing and separating section from the cleaning section may extend past the rear edge of the guide ramp 94 by the provision of a protective screen 100, thereby preventing the air stream above this screen 100 and being generated by the beater 90 to interfer with the cleaning air stream underneath this screen 100. The protective screen 100 is suspended onto the upper cleaning shoe 63 in the same manner as the protective screen 97. A sealing 101 seals the opening between the movable screen 100 and the fixed guide ramp 94.

Since the protective screen 14 and 97 deflect the draughts created by the spinning rotor means in a forward direction a precleaning of the threshed and separated grain may be obtained by providing an air and chaff outlet 108, shown in FIG. 4 at the forward end of the combine, whereby these draughts can blow chaff and other impurities through this opening out of the combine.

Other features and advantages of the present invention will occur to those skilled in the art, as will many modifications and alterations in the preferred embodiments of the invention described herein; all of which may be achieved without departure from the spirit and scope of the invention.

For convenience, reference has been made throughout the specification to grain and straw but it is to be understood that this is not intended to indicate any limitation of the ability of combines constructed in accordance with the invention.

What is claimed is:

1. In an axial flow combine having a main frame adapted to travel across a field, means for conveying crop material to the frame, means mounted on the frame for threshing and separating said crop material conveyed to said frame, the threshing and separating means extending longitudinally on said frame, means for cleaning said threshed and separated material mounted below said threshing and separating means, wherein the improvement comprises: a protective screen associated with the cleaning means and mounted adjacent and directly below said threshing and separating means to collect and convey said threshed and separated material to the cleaning means and wherein the protective screen is also operative to deflect and direct the draughts of air generated by said threshing and separating means in a forward direction to blow impurities contained in said material in a forward direction.

2. An axial flow combine as described in claim 1, wherein said combine has a discharge opening positioned in the front of said combine to permit said draughts of air to proceed from said combine.

3. In an axial flow combine having a main frame adapted to travel across a field, means for conveying the crop material to the frame, means mounted on the frame for threshing and separating said crop material conveyed to said frame, the threshing and separating means extending longitudinally on said frame, means for cleaning said threshed and separated material mounted directly below said threshing and separating means, wherein the improvement comprises: a protective screen associated with the cleaning means and mounted adjacent and directly below said threshing and separated means to collect and convey said threshed and separated material to the cleaning means, the protective screen being further operative to deflect the draughts of air generated by said threshing and separating means in a forward direction; and additional means to generate a stream of air moving in a forward direction below said protective screen, the draughts of air deflected by said protective screen and the additional means being operative to remove chaff contained in said material when said material is conveyed from said protective screen to said cleaning means, and to discharge said chaff through a forward discharge opening contained in the front of said combine.

* * * * *